UNITED STATES PATENT OFFICE.

CONRAD SCHRAUBE, ERHART SCHLEICHER, AND HANS THEODOR BUCHERER, OF LUDWIGSHAFEN-ON-THE-RHINE, GERMANY, ASSIGNORS TO THE BADISCHE ANILIN & SODA FABRIK, OF LUDWIGSHAFEN-ON-THE-RHINE, GERMANY, A CORPORATION OF GERMANY.

AZO DYE.

SPECIFICATION forming part of Letters Patent No. 716,289, dated December 16, 1902.

Application filed August 28, 1900. Serial No. 28,352. (Specimens.)

*To all whom it may concern:*

Be it known that we, CONRAD SCHRAUBE, doctor of philosophy, a subject of the King of Prussia, Emperor of Germany, ERHART SCHLEICHER, doctor of philosophy, a subject of the Duke of Saxe-Meiningen, and HANS THEODOR BUCHERER, doctor of philosophy, a subject of the King of Prussia, Emperor of Germany, all residing at Ludwigshafen-on-the-Rhine, in the Kingdom of Bavaria, Germany, have invented new and useful Improvements in Azo Coloring-Matters, of which the following is a specification.

This invention relates to the production of new azo coloring-matters which may be regarded as sulfurous-acid esters of phenolic bodies and which possess the property of being converted into different and less-soluble bodies on treatment with caustic soda or sodium carbonate. This change is accompanied by the formation of a sulfite.

We have discovered that when an aromatic diamin, such as 1.8 or 1.5 naphthylene-diamin, or a sulfo-acid of the same or metatoluylene-diamin is suitably subjected to the action of a sulfite, such as sodium bisulfite, there is formed a substance which hereinafter we will refer to as the sulfurous-acid ester of an amido-phenol body, or, for short, sulfurous-acid ester. The so-resulting product is capable of yielding a diazo compound which when combined with a suitable component yields our new azo coloring-matters possessing, among others, the above-named property. If it be desired to convert these new azo coloring-matters, in substance, into the above-mentioned less-soluble products, this may be effected by the use of sodium carbonate or of sulfuric acid. Copper sulfate, copper-sodium glycerate, ferric chlorid, or potassium bichromate also effect a similar conversion. If this is to be effected on the fiber after it has been dyed with our new coloring-matters, it is recommended to use cupric acetate.

In the following examples we illustrate the nature of our invention, but do not wish to be understood as limiting it to these. The parts are by weight.

*Example 1—Production of sulfurous-acid ester of an amido-phenol body.*—One hundred (100) parts of a twenty (20) per cent. solution of the sodium salt of 1.8-naphthylene-diamin-5-sulfo-acid are heated in a vessel provided with a stirrer, with one hundred and twenty (120) parts of a solution of sodium bisulfite of forty (40°) degrees Baumé, to a temperature of from ninety (90°) to ninety-five (95°) degrees centigrade until a test portion on weak acidulation with hydrochloric acid no longer yields a precipitate of the difficultly-soluble naphthylene-diamin-sulfo-acid. This is usually accomplished in the course of a few hours. The result is introduced into a slight excess of hydrochloric acid of about twenty (20) per cent. strength, and the sulfurous acid is removed by heating.

The so-produced sulfurous-acid ester of 1.8-amido-naphthol-5-sulfo-acid is soluble in water, giving a yellow-brown solution. It is quite stable toward cold dilute hydrochloric acid even on boiling. Carbonate of soda or caustic soda decomposes it into sodium sulfite and 1.8-amido-naphthol-5-sulfo-acid, which can be recognized by any suitable test.

In place of the 1.8-naphthylene-diamin-5-sulfo-acid of the above example we may employ 1.8-naphthylene-diamin itself (which yields the sulfurous-acid ester of 1.8-amido-naphthol) or 1.5-naphthylene-diamin or 1.5-naphthylene-diamin-sulfo-acid or metatoluylene-diamin, &c., and the sulfurous-acid ester of an amido-phenol body is obtained, and all of these esters have in common the characteristic property that when heated with carbonate of sodium or caustic soda they are decomposed into sodium sulfite and an amido-phenol body.

*Example 2—Production of the diazo compound of a sulfurous-acid ester of an amido-phenol body.*—An amount of the sulfurous-acid ester which can be obtained from 1.8-naphthylene-diamin equivalent to six and nine-tenths (6.9) parts of sodium nitrite ($NaNO_2$) is dissolved in five hundred (500) parts of water, and this solution is cooled with ice. To the cooled solution add twenty-five (25) parts of hydrochloric acid, (containing thirty-two (32) per cent. of HCl.) Now add seven and one-tenth (7.1) parts of sodium nitrite, (carrying ninety-eight (98) per cent. of $NaNO_2$.) It is recommended to keep the temperature of the liquid at or about five (5°) degrees centigrade. By employing equivalent quantities of other sulfurous-acid esters of an amido-phenol body, such as can be obtained from 1.8-naphthylene-diamin-5-sulfo-acid, 1.5-naphthylene-diamin, 1.5-naphthylene-diamin-sulfo-acid, or meta-toluylene-diamin, &c., in place of the sulfurous-acid ester used in this example corresponding diazo compounds can be obtained, and they are all capable of uniting with azo coloring-matter components, forming coloring-matters.

*Example 3—Production of a mono-azo coloring-matter containing an unsulfonated component.*—The diazo solution resulting from Example 2 when employing the sulfurous-acid ester resulting from 1.8-naphthylene-diamin is introduced into a solution of thirty-three (33) parts of crystallized sodium acetate, fourteen and four-tenths (14.4) parts of beta-naphthol, and four (4) parts of caustic soda (NaOH) in one thousand (1,000) parts of water. When the formation of coloring-matter has ceased, precipitate by means of common salt, filter, wash with salt brine, and dry at a temperature of about fifty (50°) degrees centigrade. This coloring-matter dyes wool an orange color. Its aqueous solution on being boiled with an excess of sodium carbonate yields a violet precipitate.

If the diazo compound employed in the preceding example be combined with equivalent quantities of meta-phenylene-diamin, resorcin, or 2.3-dioxy-naphthalene and the like and in accordance with the ordinary rules of the art for carrying out such operations, our new coloring-matter likewise results.

In place of the diazotized sulfurous-acid ester of the amido-phenol body which can be derived from 1.8-naphthylene-diamin which is employed in this example we can employ the analogous diazotized sulfurous-acid esters of amido-phenol bodies which can be derived from other diamins, as hereinbefore described.

The following table presents some of the properties of some of our new coloring-matters:

| The coloring-matter which can be derived from diazotized sufurous-acid ester of an amido-phenol body— | | Dyes wool. | Aqueous solution on treatment with sodium carbonate. | |
|---|---|---|---|---|
| From— | And— | | Cold. | Boiling. |
| 1.8-naphthylene-diamin | Beta-naphthol | Orange-red | | Violet precipitate. |
| | Meta-phenylene-diamin. | Brown-orange | | Brown precipitate. |
| | Resorcin | Orange | | Changes from brown-yellow to violet-brown. |
| | 2-3-dioxy-naphthalene. | Brown-red | Changes from red-brownish yellow to yellow-brown. | Violet precipitate. |
| 1.8-naphthylene-diamin-5-sulfo-acid | Beta-naphthol | Scarlet | | Changes from scarlet to violet. |
| | Meta-phenylene-diamin. | Brown | | Changes from brownish yellow to bordeaux. |
| 1.5-naphthylene-diamin | Beta-naphthol | Brownish orange | Scarlet | Violet-red precipitate. |
| 1.5-naphthylene-diamin-sulfo-acid | Beta-naphthol | Brownish yellow | | Changes from brown-yellow to dark brown. |
| Meta-toluylene-diamin | Beta-naphthol | Brownish orange | | Becomes darker in color. |

The coloring-matter which can be obtained from the diazotised sulfurous-acid ester obtainable from 1.5-naphthylene-diamin sulfo-acid and beta-naphthol when boiled with a slight excess of sodium-carbonate solution yields a liquid which if subsequently acidulated with acetic acid yields a ponceau color, while if it be acidulated with hydrochloric acid a violet precipitate results.

*Example 4—Production of a mono-azo coloring-matter containing a sulfonated component.*—The diazo solution resulting from Example 2 when employing the sulfurous-acid ester resulting from 1.8-naphthylene-diamin is introduced while stirring into a solution of twenty-four (24) parts of 1.8-amido-naphthol-4-sulfo-acid (pure and free from water) and thirty-six (36) parts of calcined sodium carbonate, which is cooled with ice to about five (5) degrees centigrade. When formation of the coloring-matter ceases, precipitate in the cold by means of common salt, filter, wash with salt brine, press, and dry at a temperature of about fifty (50) degrees centigrade. The coloring-matter so resulting dyes wool a violet-red, and its solution in a slight excess of sodium carbonate has a red color, which becomes blue on boiling. In place of the 1.8-amido-naphthol-4-sulfo-acid we can employ an equivalent quantity of 1.4-naphthol-sulfo-acid, and the dyestuff so resulting dyes wool a yellowish red, and when its aqueous solution is boiled with sodium carbonate it becomes reddish violet.

*Example 5—Production of a primary disazo coloring-matter.*—A. Introduce into the diazo solution resulting from Example 2 when employing the sulfurous-acid ester resulting from 1.8-naphthylene-diamin, while stirring, a neutral solution of twenty-six and one-tenth (26.1) parts of the sodium salt of 1.8-amido-naphthol-4-sulfo-acid. When no more coloring-matter is formed, add sufficient sodium carbonate to convert the coloring-matter into its sodium salt and enough water to bring it into solution. Now add twenty-five (25) parts of sodium bicarbonate, and into this introduce, while stirring, the diazo compound resulting from nine and three-tenths (9.3) parts of anilin, collect the coloring-matter by precipitating in the cold with common salt, filter, wash with weak salt brine, press, and dry at a temperature of about fifty (50°) degrees centigrade. This coloring-matter dyes wool a blue-black shade from an acid-bath, which shade on treatment with copper acetate is changed to a red-brown, possessing increased fastness to washing as compared with the blue-black shade. The coloring-matter dissolves in water, giving a solution of a blue-violet color, which on addition of sodium carbonate becomes a pure blue. On boiling this solution it deposits a dark-colored bronzy precipitate. On continued boiling the liquid becomes red. If alpha-naphthylamin be employed in place of anilin in the above example, a coloring-matter is obtained which possesses analogous properties. The shade obtained on dyeing is of a greener cast, however.

B. Prepare, in the well-known manner, the old mono-azo coloring-matter by combining in acid solution twenty-three and nine-tenths (23.9) parts of 1.8-amido-naphthol-4-sulfo-acid with the diazo compound resulting from nine and three-tenths (9.3) parts of anilin. Convert it into its sodium salt by means of sodium carbonate and dissolve it in the requisite quantity of water. To this solution add twenty-five (25) parts of sodium bicarbonate, and into this introduce, while stirring, the diazo solution resulting from Example 2 when employing the sulfurous-acid ester resulting from 1.8-naphthylene-diamin. Collect the coloring-matter by precipitating it with common salt in the cold, filter, wash with weak salt brine, press, and dry at a temperature of about fifty (50°) degrees centigrade. This coloring-matter dissolves in water, giving a solution of a somewhat more reddish cast than the isomeric coloring-matter of Example 5, A. If sodium carbonate be added to the cold aqueous solution, a violet precipitate results which on boiling in its liquor dissolves, giving a blue solution. This solution on cooling deposits a blue flocculent precipitate and is distingished from the coloring-matter whose production has been above described by becoming grayish on treatment with hydrochloric acid, whereas the latter changes from violet to blue-green. This coloring-matter dyes wool a blue-black shade from an acid-bath, which shade on treatment with copper acetate assumes a greenish cast.

If in place of the sulfurous-acid ester employed in the above example there be used the sulfurous-acid ester which can be obtained from 1.5-naphthylene-diamin sulfoacid or from 1.8-naphthylene-diamin-5-sulfo-acid, coloring-matters are obtained which also dye wool in black shades, and if in place of the anilin of the above example alpha-naphthylamin be employed coloring-matters of analogous properties are obtained.

*Example 6—Production of a secondary disazo coloring-matter.*—Diazotize a quantity of the sulfurous-acid ester resulting from 1.8-naphthylene-diamin-5-sulfo-acid corresponding to six and nine-tenths (6.9) parts of sodium nitrite ($NaNO_2$) by means of twelve (12) parts of hydrochloric acid (containing thirty-two (32) per cent. of HCl) and seven and one-tenth (7.1) parts of sodium nitrite, (containing ninety-eight (98) per cent. of $NaNO_2$.) Introduce this diazo solution into a solution containing eighteen (18) parts of the hydrochlorid of alpha-naphthylamin. Now add sufficient water to effect solution and diazotize the result by means of twelve (12) parts of the above-described hydrochloric acid and seven and one-tenth (7.1) parts of the above-described sodium nitrite. Since the diazotation takes place but slowly at the temperature ordinarily employed for such operations, it is recommended to heat the solution to about thirty (30°) or forty (40°) degrees centigrade. The so-prepared diazo solution is introduced into a solution containing twenty-four and six-tenths (24.6) parts of the sodium salt of 1.4-naphthol-sulfo-acid and thirty (30) parts of calcined sodium carbonate. The coloring-matter resulting can be collected by precipitating with common salt, filtering, washing with dilute salt brine, pressing, and drying, as hereinbefore described. It dyes wool violet. Its aqueous solution when boiled with an excess of sodium carbonate becomes bluer in color.

If instead of employing the alkaline solution of 1.4-naphthol-sulfo-acid one uses the equivalent quantity of the hydrochlorid of alpha-naphthylamin, a coloring-matter is obtained which it is recommended to keep in paste form. It dyes wool a reddish black. Its aqueous solution when boiled with an excess of sodium carbonate yields a brown-violet precipitate.

From the foregoing examples it will be seen that the new diazo compounds which can be prepared from hereinbefore-described sulfurous-acid esters of amido-phenol bodies are capable of application in the production of azo coloring-matters and can be used in the production of almost all types of azo coloring-matters for which mono-diazo bodies may be employed. It will also be observed that the coloring-matters produced with their aid possess that property which is common to phenolic esters of acids—namely, saponification into the corresponding phenol and acid or salts of the same, in this case sulfurous acid or a sulfite by saponifying agents, such as sodium carbonate or caustic soda—and, further, that the phenolic saponification product is a colored body possessing a color different from that of the esterified coloring-matter and possessing a less greater solubility than the same.

Our new coloring-matters are distinguished from any hitherto known by the following behavior: When placed in cold dilute five (5) per cent. sulfuric acid, they do not emit an odor of sulfurous acid. If, however, they be boiled with an excess of sodium carbonate and the result be acidified with dilute sulfuric acid, sulfurous acid is liberated.

What is claimed is—

1. The azo coloring-matter which on treatment in the cold with dilute sulfuric acid does not yield sulfurous acid; but, when boiled with an excess of sodium-carbonate solution yields a liquid which on addition of an excess of dilute sulfuric acid, gives sulfurous acid.

2. The azo coloring-matter which is a sulfurous-acid ester of a phenolic body and which on treatment in the cold with dilute sulfuric acid does not yield sulfurous acid; but, when boiled with an excess of sodium-carbonate solution yields a liquid which, on addition of an excess of dilute sulfuric acid, gives sulfurous acid.

3. The polyazo coloring-matter which is a sulfurous-acid ester of a phenolic body and which on treatment in the cold with dilute sulfuric acid does not yield sulfurous acid; but, when boiled with an excess of sodium-carbonate solution yields a liquid which, on addition of an excess of dilute sulfuric acid, gives sulfurous acid.

4. The disazo coloring-matter which is a sulfurous-acid ester of a phenolic body and which on treatment in the cold with dilute sulfuric acid does not yield sulfurous acid; but, when boiled with an excess of sodium-carbonate solution yields a liquid which, on addition of an excess of dilute sulfuric acid, gives sulfurous acid.

5. The primary disazo coloring-matter which is a sulfurous-acid ester of a phenolic body and which on treatment in the cold with dilute sulfuric acid does not yield sulfurous acid; but, when boiled with an excess of sodium-carbonate solution yields a liquid which, on addition of an excess of dilute sulfuric acid, gives sulfurous acid.

6. The primary disazo coloring-matter which on suitable treatment with a reducing agent yields sulfurous-acid ester of 1.8-amido-naphthol, an aromatic amine, and a diamido derivative of 1.8-amido-naphthol-4-sulfo-acid, and which coloring-matter on treatment, in the cold, with dilute sulfuric acid does not yield sulfurous acid; but, when boiled with an excess of sodium-carbonate solution, yields a liquid which, on addition of an excess of dilute sulfuric acid, gives sulfurous acid.

7. The primary disazo coloring-matter which on suitable treatment with a reducing agent yields sulfurous-acid ester of 1.8-amido-naphthol and a diamido derivative of 1.8-amido-naphthol-4-sulfo-acid and anilin, and which coloring-matter on treatment, in the cold, with dilute sulfuric acid does not yield sulfurous acid; but, when boiled with an excess of sodium-carbonate solution, yields a liquid which, on addition of an excess of dilute sulfuric acid, gives sulfurous acid.

8. The primary disazo coloring-matter, which can be obtained by combining a diazotized aromatic amine, in acid solution, with 1.8-amido-naphthol-4-sulfo-acid and then combining this product, in alkaline solution, with diazotized sulfurous-acid ester of 1.8-amido-naphthol and which coloring-matter on treatment in the cold, with dilute sulfuric acid does not yield sulfurous acid; but, when boiled with an excess of sodium-carbonate solution it yields a liquid which, on addition of an excess of dilute sulfuric acid gives sulfurous acid.

9. The primary disazo coloring-matter which can be obtained by combining diazotized anilin, in acid solution, with 1.8-amido-naphthol-4-sulfo-acid and then combining this product, in alkaline solution, with diazotized sulfurous-acid ester of 1.8-amido-naphthol and which coloring-matter on treatment, in the cold, with dilute sulfuric acid does not yield sulfurous acid; but, when boiled with an excess of sodium-carbonate solution it yields a liquid which, on addition of an excess of dilute sulfuric acid gives sulfurous acid; it dissolves in water giving a violet solution, which solution with sodium carbonate yields a flocculent precipitate in the cold and which precipitate, on boiling in its liquor, dissolves giving a blue solution; the coloring-matter dyes wool a black shade which, on treatment with copper acetate, assumes a greenish cast.

In testimony whereof we have hereunto set our hands in the presence of two subscribing witnesses.

CONRAD SCHRAUBE.
ERHART SCHLEICHER.
HANS THEODOR BUCHERER.

Witnesses:
BERNHARD C. HESSE,
JACOB ADRIAN.